United States Patent [19]

Cheffetz et al.

[11] Patent Number: 5,133,065
[45] Date of Patent: Jul. 21, 1992

[54] BACKUP COMPUTER PROGRAM FOR NETWORKS

[75] Inventors: Edward L. Cheffetz, Tampa; Ronald C. Searls, Brandon, both of Fla.

[73] Assignee: Personal Computer Peripherals Corporation, Tampa, Fla.

[21] Appl. No.: 386,517

[22] Filed: Jul. 27, 1989

[51] Int. Cl.⁵ .............................................. G06F 11/20
[52] U.S. Cl. ................................. 395/575; 364/285.1; 364/268.1; 364/DIG. 1; 364/943.92; 364/DIG. 2
[58] Field of Search ................ 364/200, 900; 371/7, 371/8.1, 8.2

[56] References Cited

U.S. PATENT DOCUMENTS 4,893,307  1/1990  McKay .......................... 370/60 X

Primary Examiner—Robert W. Beausoliel
Attorney, Agent, or Firm—Dominik, Stein, Saccocio, Reese, Colitz & VanDerWall

[57] ABSTRACT

A computer network for backing up data and program files located on networked workstations onto a centralized backup media of a backup device of the network. The backup computer network allows users of workstations of remote nodes to preselect files (by name and by file selection criteria) on their workstation which are to be backed onto the centralized backup media. The file selection processes are therefore distributed throughout the network which considerably increases the speed of backing up over the network.

10 Claims, 1 Drawing Sheet

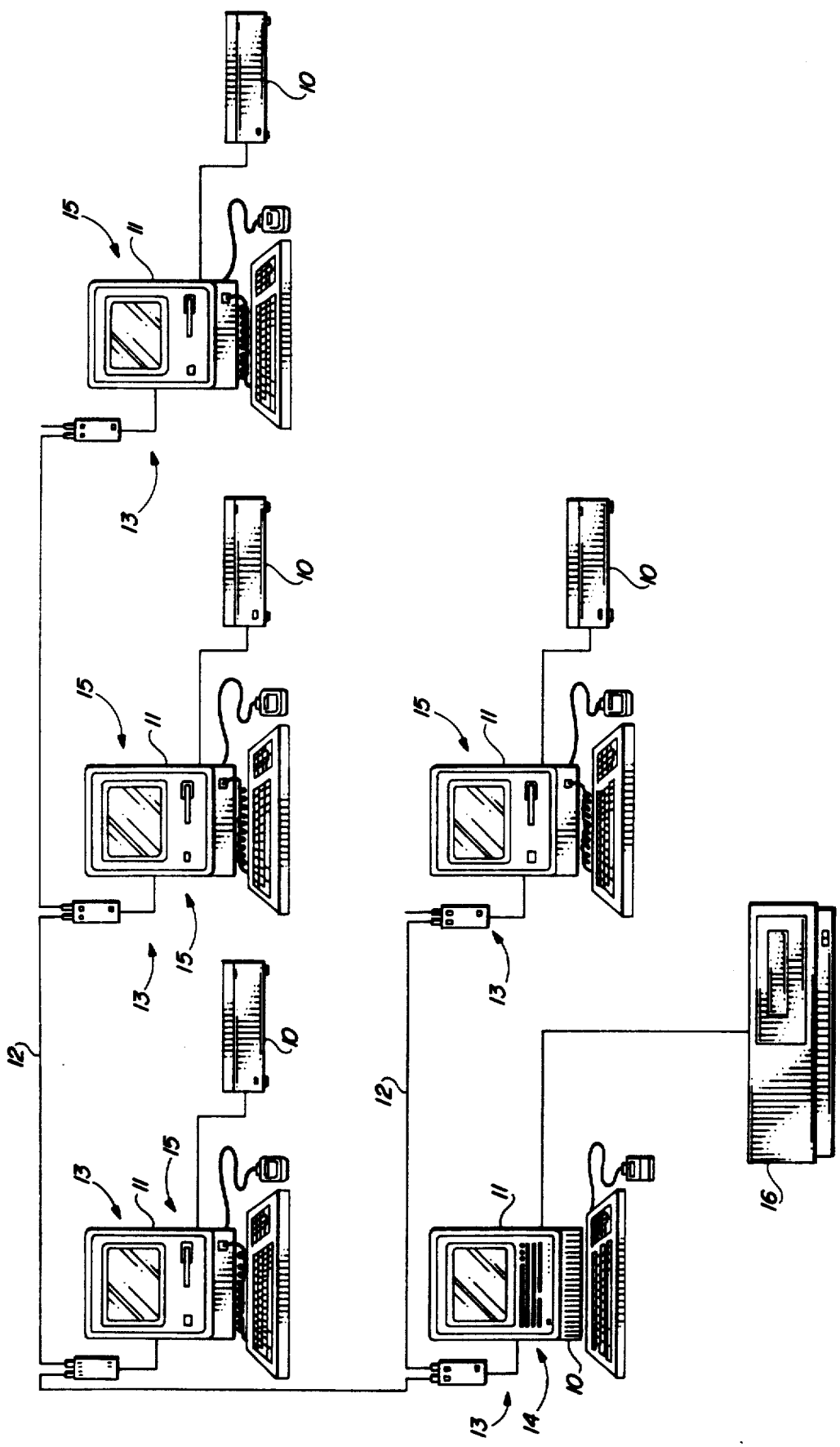

BACKUP COMPUTER PROGRAM FOR NETWORKS

BACKGROUND OF THE INVENTION

1. Field of the Invention

This invention relates to computer programs for periodically backing up computer data and program files onto backup media for subsequent restoring in the event the files are inadvertently corrupted or destroyed. More particularly, this invention relates to computer backup programs which operate over a wide or local area network to backup files located on remote nodes of the network.

2. Description of the Background Art

A wide area network is a communication network used by one or more organizations over possibly great distances that permits the organizations, users to share information and resources. Local area networks are similar, but are usually used or write to the files of other users located on the other users, workstation nodes or on the file server and to utilize the printers and other peripherals.

Similar to multiuser computer systems, all data and program files on all storage media in all nodes of a network should be periodically backed up to allow restoration of files that may become corrupted or destroyed because of hardware or software failures or that are inadvertently deleted or changed.

There presently exist many backup utility programs for multiuser systems, network file servers and workstations (whether connected to a network) which copy program and data files, usually in a compressed structure, onto backup media such as magnetic tape(s) or disk(s). Typically, most backup programs allow disk-wide backup or selective backup of files based upon a file directory tree and a variety of file selection criteria, such as file names with and without wildcard characters or extensions and such as last accessed, modified, created, or backed up files. Some of these backup programs further allow the user (or the system administrator) to predefine the file tree and selection criteria so that periodic backups can be easily made without requiring the user to rethink his backup strategy.

Recommended backup strategy usually includes infrequently, such as monthly, making a disks-wide backup of program and data files (commonly referred to as a "baseline" backup). Then, very frequently, such as daily, file selection backups are made of newly created or modified data files (commonly referred to as "incremental" backups). Thus, in the event files are corrupted, destroyed or deleted, the newest copies of such files may be restored from the incremental or baseline backups.

Existing backup utility programs attempt to achieve the common goal of simplifying the backup procedures so that proper backups are actually made. Proper backups of networked file servers are usually made because most file servers include a large capacity streaming tape or other storage device. Unfortunately, backing up of networked nodes is often neglected because most workstations thereof include only a floppy disk drive onto which a backup could be made. During backup, the network user is required to monitor his workstation and insert backup floppy disks as required. Because backups are time consuming, the user is reluctant to and often does not backup his workstation as often as is recommended. Thus, there exits a need for backing up networked nodes with minimal user attention and involvement.

With specific regard to networked workstations, software sold under the trademark "3+Backup" by 3Com of Mountainview, Calif. is capable of backing up (baseline and incremental) files on all workstations in the network onto a streaming tape backup unit of a dedicated file server. A similar backup program sold under the trademark "Emerald System" by Emerald Systems Corporation of San Diego, Calif. allows network users of the remote workstation nodes to perform a backup by sending selected files to be backed up to a networked backup device. Unfortunately, such backup software performs its file selection phase over the network thereby compromising the users, security considerations and over-utilizing valuable network resources.

Therefore, it is an object of this invention to provide improved backup computer software which overcomes the aforementioned inadequacies of the prior art software.

Another object of this invention is a backup computer program specifically designed for use over a computer network allowing the transfer of files from the storage media of a workstation or file server of each node of the network onto centralized backup media such as magnetic tape(s) or disk(s).

Another object of this invention is to provide a backup computer program for a network which allow the user of each workstation of a node to preselect the files on the workstation (or his files on the file server) to be backed up based upon file directory trees or file selection criteria, such as file names with and without wild card characters or extensions and such as last accessed, modified, created or backed up files, thereby allowing the user to maintain security of confidential data and program files.

Another object of this invention is to provide a backup computer program for a network in which the processing of files to be backed up, based upon a file directory tree or file selection criteria, is performed on each workstation node to produce a list of files to be backed up, thereby minimizing processing over the network and otherwise over-utilizing valuable network resources.

Another object of this invention is to provide a backup computer program for a network which is initiated by a master workstation on a central node of the network such that the remote workstations substantially concurrently begin selecting files to be backed up.

Another object of this invention is to provide a backup computer program for a network in which a list of the backed up files is stored on the master workstation of the central node and on the workstations of each remote node, thereby allowing the remote workstations to perform incremental backups based upon file selection criteria without having to access, over the network, the list on the master workstation of the central node or otherwise requiring reading of the backup media over the network, which may or may not be mounted.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a computer program for backing up data and program files located on networked workstations onto a centralized backup media of a backup device of the network, such as streaming magnetic tape(s) or large magnetic or optical disk(s).

A feature of the backup computer program of the invention is the manner in which the files to be backed up are selected Specifically, the backup computer program of the invention allows users of workstations of remote nodes to preselect files (by name and by file selection criteria) on their workstation which are to be backed up onto the centralized backup media. This cooperative file selection on each such workstation is accomplished only by the user of that workstation so that the user maintains his security over confidential data or program files.

Another feature of the backup program of the invention is the distribution of the file selection processes throughout the network which considerably increases the speed of backing up over the network. More specifically, since the network is a shared resource, processes which involve exchanges of information over the network will consume the shared resource and slow down or block out other potential users.

To minimize network over-consumption, the backup computer program of the invention proceeds in two stages; first selecting the files of each remote workstation to be included in the backup and then secondly, transferring such files to the centralized backup device. More specifically, once initiated by a central or master workstation, the file selection phase for each remote workstation of the remote nodes occurs on each such remote workstation as opposed to occurring over the network as in prior art backup programs. During the file selection phase on each remote workstation, a list of files to be backed up is produced based upon file names, file directory trees and file selection criteria established by the user of each such workstation. Then, the remote workstation signals the master workstation that it has finished its file selection phase and is ready for the listed files to be copied over the network for backup onto the centralized backup device. Notably, this cooperative backup allows the remote workstations of remote nodes to compile their respective backup lists substantially concurrently. The master workstation preferably begins the file backup of the remote workstation first to complete its backup list and then backs up the other remote workstations as they complete their backup lists.

A further feature of the backup computer program of the invention is its ability to allow incremental backups. Specifically, once a baseline backup is made and a list of backup files is made, a copy of the baseline backup list is kept on the workstation of each remote node. By referring to the copy of the baseline backup list, each remote workstation can perform incremental backups of only those files which have changed since the last baseline backup. Thus, because of the redundancy of the baseline backup list, the remote workstations need not parse the backup media of the backup device over the network (which may involve multiple tape or disk swapping) simply to compute incremental backups of files on such workstations.

It is noted that such incremental daily backups usually do not involve tape or disk swapping of the centralized backup device since the files which are changed daily are relatively few (as compared to a baseline backup). Thus, unlike periodic baseline network backups, incremental network backups can be performed without a system administrator monitoring the backup device simply to swap tapes, disks or other backup media. Incremental backups can therefore be scheduled for off-peak periods, such as the early morning or late evening hours of the day.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawing illustrating a diagrammatic view of a typical computer network.

DETAILED DESCRIPTION OF THE PREFERRED EMBODIMENT

KEY TERMS AND ASSUMPTIONS

Backup—Backup is generally defined to be the process of copying files from one storage device to another storage device for the purpose of archiving data and programs, so that a copy will exist (the "backup" copy) in case the original data or programs are destroyed or lost; however, the computer program of the invention is applicable to file transfers between computers on a network, and is not restricted to file transfers for the sole purpose of backing up. For purposes herein, "back up" will be used to describe file transfers.

Local Storage Device (LSD)—A local storage device 10 is a storage device, including, but not limited to disk drives and tape drives, which is "attached" to a computer 11 on a network. "Attachment" is logical, not physical. Storage devices which appear to be local devices to a program running on a node (such as a network server), although not physically attached to the node itself, are considered to be local storage devices.

Network—Backup operations take place on a network 12, where a network is defined as a group of connected computers, at least some of which have local storage devices; two computers are "connected" when they can exchange messages and data; the connection technology, the network topology, the network protocols, the type of computer and the type of local storage devices can vary.

Node, Network Node—A computer and its local storage devices (if any) which is connected to a network is referred to as a node 13, or network node.

Controlling Node, Remote Node—One of the network nodes is designated as the "controlling node" 14 and the remainder of the network nodes are designated as "remote nodes" 15.

Network Administrator, Network User—The person(s) who interacts with (uses) programs on the controlling node is called the Network Administrator. Persons who interact with (use) programs on remote nodes are called users or network users.

Network Backup—A network backup is defined to be the transfer of files from the local storage devices attached to the remote nodes on a network to a local storage device 16 attached to the controlling node on a network.

Remote Backup Set—A Remote Backup Set is defined to be a list of files (a set) that are to be backed up; a backup set can also include selection criteria such as file type (application, document, system file), before-/after a modification data and time, file name (pattern matching on character strings), file ownership (e.g. all "c" source files) or version number.

For example, consider the following list of files:

| NAME | LAST MODIFIED |
|---|---|
| DOTHIS.F77;1 | 11-May-88 |
| DOTHAT.F77;1 | 11-May-88 |
| GREAT.FTN;1 | 11-May-88 |
| TEST.FTN;1 | 11-May-88 |
| DOTHIS.FTN;1 | 11-May-88 |
| DOTHIS.FTN;2 | 11-May-88 |
| FTN77 | 10-May-77 |
| MODULE.TXT;1 | 13-May-89 |
| LETTER.TXT;1 | 15-Jan-89 |

A backup set could be constructed from this list: all files of type .FTN, plus all files modified after May 1, 1989 and the file FTN77. This would give us the following list:

| NAME | LAST MODIFIED | REASON FOR INCLUSION |
|---|---|---|
| GREAT.FTN;1 | 11-May-88 | .FTN type |
| TEST.FTN;1 | 11-May-88 | .FTN type |
| DOTHIS.FTN;1 | 11-May-88 | .FTN type |
| DOTHIS.FTN;2 | 11-May-88 | .FTN type |
| FTN77 | 10-May-77 | individual selection |
| MODULE.TXT;1 | 13-May-89 | modified after 1-May-89 |

Note that files can be included because they satisfy an inclusion test, or because they are individually selected (are members of an inclusion class with only one member). This is an important distinction for incremental backups. Users may want incremental backups to include not only files which have changed, but new files which belong to a certain class (documents, files in a particular sub-directory, etc.) If the backup set was simply a list of files, without selection criteria, there would be no way to specify that files which had been added since the last backup should (or should not) be included in an incremental backup.

A Remote Backup Set (RBS) is then defined to be a backup set which describes files which are on the local storage device of a remote node, and not on the local storage device of the controlling node. The Remote Backup Set itself may be stored on a storage device attached to the controlling node or on a storage device attached to a remote node. Note that while the file set is called a remote backup set, its use is not restricted to backups.

CODE MODULES OVERVIEW

Remote Node Programs—One copy of each program per node.

BSCreate—This is a program to create a backup set, and runs on each remote node.

BSExecute—This program uses an existing remote backup set and the contents of a node's local storage device (LSD) to create a temporary RBS, or tRBS. (Note that as actually implemented, BSCreate and BSExecute are combined into one program).

Node Daemon—This is a program that turns in the background on a remote node. This program monitors network traffic and detects and interprets messages used in the network backup process; causes BSExecute to run and communicates with it at the appropriate points in the backup process; reads file blocks from the LSD end and transfers them to the controlling node. This type of program could be done as TSR on an IBM PC, a daemon on Unix systems or an INIT on a Macintosh.

Controller Node Programs

BSSchedule—This is a program to schedule a network backup. This program displays a list of the available RBSs on the network, allows the Network Administrator to select a set of subset of the RBSs for backup, and schedule the time at which the backup of those RBSs is to take place.

DoNetBack—This is a program to execute the network backup; this program controls the transfer of files or blocks of data (image backup) between the MasterDaemon (see below) and the network backup device (the network backup device is usually, but not always, a local storage device attached to the controlling node).

MasterDaemon—This is a program that runs in the background on the controlling node. This program checks the current time and determines if it is time to run DoNetBack. Once DoNetBack is started the MasterDaemon sends messages to nodes on the network at the request of NetBack, monitors network traffic and detects and interprets messages sent back to the controlling node, receives file blocks from remote LSDs and transfers then to DoNetBack.

LEGEND

```
"     is a Statement executed by BSCreate or BSSchedule
+     is a Statement executed by MasterDaemon
-     is a Statement executed by NodeDaemon
$     is a Statement executed by DoNetBack.
#     is a Statement executed by BSExecute
@     is an action taken by a user
```

\* Statement numbers which are postfixed with an asterisk are executed in parallel by all network nodes involved in the backup.

ALGORITHM

| | | |
|---|---|---|
| a1 | @ Create a RBS by running BSCreate on a user node (Repeat on each remote node with a local storage device) | |
| a1.1 | "BUILD a list of storage devices local to the remote node | |
| a1.2 | "DISPLAY the list | |
| a1.3 | "ALLOW user to select a storage device | |
| a1.4 | "IF user quits, THEN exit program | |
| a1.5 | "ELSE IF user selects continue, THEN | |
| a1.5.1 | "BUILD a list of all files on the remote node local storage device; include file name, size, type, modification date | |
| a1.5.2 | "DISPLAY the list | |
| a1.5.3 | "ALLOW user to select files individually or by a criterion | |
| a1.5.4 | "IF user selects an individual file THEN mark it for backup | |
| a1.5.5 | "ELSE IF user selects a criterion THEN mark all files in list which fit the criterion for backup | |
| a1.5.6 | "ELSE IF user selects cancel, THEN return to a1.1 | |
| a1.5.7 | "ELSE IF user selects continue, THEN | |
| a1.5.8 | "BUILD a new list containing only those files marked for backup | |
| a1.5.9 | "COMBINE this list with the user's selection criteria | |
| a1.5.10 | "SAVE the list and selection criteria (this is the RBS) | |
| a1.5.11 | RETURN to a1.1 | |
| a2 | @INSTALL MasterDaemon to run in the background on the controlling node | |
| a3 | @Schedule a network backup, by running BSSchedule on the controlling node | |
| a3.1 | *REQUEST MasterDaemon to query the network | |
| a3.1.1 | +BUILD a list of online remote nodes | |
| a3.1.2 | +INITIALIZE an empty list of remote RBSs: NET_RBS_LIST | |
| a3.3.3 | +FOR each node in the list DO | |
| a3.1.3.1 | +QUERY; do you have any RBS? | |
| a3.1.3.2 | -SEARCH local storage volume for RBSs | |
| a3.1.3.3 | -BUILD a list of RBSs on the local storage volume | |
| a3.1.3.4 | -RESPONSE; return the list of RBSs | |
| a3.1.3.5 | +ADD RBSs to the NET_RBS_LIST | |
| a3.1.4 | +RETURN RBS_LIST to BSSchedule | |
| a3.2 | "DISPLAY the list RBS_LIST | |
| a3.3 | "INITIALIZE an empty list: SCHEDULE_LIST | |
| a3.4 | "IF no MASTER SCHEDULE FILE exists, THEN create one | |
| a3.5 | "ALLOW user to select a RBS from the displayed list | |
| a3.6 | "IF user selects quit, THEN exit program | |
| a3.7 | "ELSE IF user selects a RBS, THEN add it to SCHEDULE_LIST | |
| a3.8 | ELSE IF user selects continue, THEN | |
| a3.8.1 | "DISPLAY date/time for selection | |

| | |
|---|---|
| a3.8.2 | "ALLOW USER to select a date/time for the network backup |
| a3.8.3 | "IF user selects cancel then return to a3.4 |
| a3.8.4 | "IF user selects a time and date THEN |
| a.3.8.4.1 | "Save the list of RBS and the date and time for the backup in the MASTER SCHEDULE file |
| a3.8.4.2 | "Exit | a4 + MasterDaemon runs periodically on the controlling node. Each time it runs, it checks the MASTER SCHEDULE file; if the current time is equal to the time a network backup is schedule to be run, then the MasterDaemon causes DoNetBack. to be run.

a5 $ DoNetBack. is started by MasterDaemon when it is time to begin a network backup; the MasterDaemon passes the appropriate SCHEDULE_LIST to DoNetBack.

| | |
|---|---|
| a5.1 | $REQUEST MasterDaemon to awaken the network |
| a5.1.1 | +Initialize a list of active nodes; NODE_LIST |
| a5.1.2 | +FOR each node in the SCHEDULE_LIST DO |
| a5.1.2.1 | +MESSAGE: if you have any RBSs, get ready for backup |
| a5.1.2.2 | -RESPONSE: this node is active or time-out |
| a5.1.2.3 | +IF response is active THEN add node to NODE_LIST |
| a5.1.3 | FOR each node in the active list DO |
| a5.1.3.1 | +SEND list of RBS names from the SCHEDULE_LIST |
| a5.1.3.2 | -SET status to BUSY |
| a5.2 | $SET done flag to false |
| a5.3* | $WHILE not done |
| a5.3.1* | $REQUEST MasterDaemon to get the next available tRBS on the network |
| | ___<Following executes on controlling nodes>___ |
| a5.3.1.1* | +POLL nodes from active list UNTIL an active remote node which has an RBS in the SCHEDULE_LIST returns status READY TO BACKUP, OR UNTIL all active remote nodes have reported READY TO BACKUP OR UNTIL a timeout has expired |
| | ___<Following executes on EACH active remote node>___ |
| | ___<which has an RBS in the SCHEDULE_LIST>___ |
| A5.3.1.2* | -FOR each RBS |
| a5.3.1.2.1* | -SEARCH local storage volume for RBS |
| a5.3.1.2.2* | -IF RBS is not found mark it as unavailable |
| a5.3.1.2.3* | -ELSE start up BSExecute, passing current RBS as a parameter |
| a5.3.1.2.4* | #Open storage device specified in RBS |
| a5.3.1.2.5* | #Initialize a list of files to be backed up; BACKUP_LIST; each file has an associated Boolean flag; when this flag is true, the file is said to be "marked for backup". |
| a5.3.1.2.6* | #FOR each file in the storage device DO |
| a5.3.1.2.6.1* | #IF file is in RBS THEN add to BACKUP_LIST |
| a5.3.1.2.6.2* | #ELSEIF file is a member of a class defined by the selection criteria stored in the RBS THEN add TO BACKUP_LIST |
| a5.3.1.2.6.3* | #ELSEIF file is a member of a |

```
                                directory in the RBS all of whose
                                files were originally backed up then
                                add to BACKUP_LIST
a5.3.1.2.7*            #IF RBS specifies an INCREMENTAL backup THEN
a5.3.1.2.7.1*                  #FOR each file in the BACKUP_LIST DO
a5.3.1.2.7.1.1*                       #IF file is not in the RBS
                                      THEN mark it for backup
a5.3.1.2.7.1.2.*                      #ELSEIF file is in the RBS
                                      AND its size or date of last
                                      modification or name has
                                      changed, THEN mark it for
                                      backup
a5.3.1.2.8*            #ELSE mark all files in BACKUP_LIST for
                       backup
a5.3.1.2.9*            #SAVE BACKUP_LIST as a temporary RBS (tRBS)
a5.3.1.2.10*           #QUIT BSExecute
a5.3.1.3*           -SET status to READY-TO-BACKUP (a5.3 through a5.3.1.3 are relisted here for convenience of reader)

a5.3               $WHILE not done
a5.3.1                 $REQUEST MasterDaemon to get the next
                       available tRBS on the network
a5.3.1.1                      + Poll active nodes
a5.3.1.2*                     -Build tRBS
a5.3.1.3*                     -Report ready to backup status
a5.3.1.4                      +Return status to DoNetBack,
                              indicating that a node has a tRBS and
                              is ready to be backed up, or that
                              there are not more nodes to backup
a5.3.2                 $IF MasterDaemon returns no more nodes THEN
                       set done to true (exit WHILE loop)
a5.3.3                 $ALLOCATE space to store tRBS from the remote
                       node
a5.3.4                 $DO:REQUEST MasterDaemon to get a tRBS block
                       from the currently active remote node
a5.3.4.1                      +ALLOCATE a local block of storage
a5.3.4.2                      +MESSAGE: to remote node, send next
                              block of tRBS over the network
a5.3.4.3                      -RESPONSE: done flag or next tRBS
                              block
a5.3.4.4                      +RETURN done flag or next tRBS block
a5.3.5                 $UNTIL tRBS completely read
a5.3.6                 $ FOR each file in tRBS DO
a5.3.6.1                      $REQUEST MasterDaemon to OPEN the
                              file on the currently active remote
                              node
a5.3.6.1.1                           +MESSAGE: to remote node,
                                     open file
a5.3.6.1.2                           -RESPONSE: file open or error
                                     flag
a5.3.6.2               $ IF open error THEN mark file as not backed
                       up and proceed to next file
a5.3.6.3               $ OPEN file on network backup device
a5.3.6.4               $ IF open error THEN mark file as not backed
                       up and proceed to next file
a5.3.6.5               $ DO:REQUEST MasterDaemon to get a file block
                       from the open file on currently active remote
                       node
a5.3.6.5.1                    +ALLOCATE a local block of storage
a5.3.6.5.2                    +MESSAGE: to remote node, send next
                              block of file over the network
```

| | |
|---|---|
| a5.3.6.5.3 | −RESPONSE: done/error flag or next file block |
| a5.3.6.5.4 | +RETURN done/error flag or next file block |
| a5.3.6.5.5 | $WRITE file block to network backup device |
| a5.3.6.6 | $UNTIL file completely read or error |
| a5.3.6.7 | $IF read error THEN mark file as not backed up |
| a5.3.6.8 | $REQUEST MasterDaemon to CLOSE the file on the currently active remote node |
| a5.3.6.8.1 | +MESSAGE: to remote node, close file |
| a5.3.6.8.2 | −RESPONSE: file closed |
| a5.3.6.9 | $CLOSE file on network backup device |

(Note: the RBS which the remote node used to generate the tRBS, has also been stored on the network backup device if this is not the first in a series of incremental backups)

| | |
|---|---|
| a5.3.7 | $IF this is an incremental backup, and it is not the FIRST in a series of incremental backups THEN |
| a5.3.7.1 | $ALLOCATE space for the RBS from backup device |
| a5.3.7.2 | $ALLOCATE space for a merged RBS |
| a5.3.7.3 | $Open the RBS file on network backup device |
| a5.3.7.4 | $Read the RBS file on network backup device |
| a5.3.7.5 | $FOR each file in the tRBS that was backed up DO |
| a5.3.7.5.1 | $IF file is in RBS AND NOT in tRBS THEN move all entries for this file from the RBS to merged RBS |
| a5.3.7.5.2 | $ IF file is in tRBS AND NOT in RBS THEN move entry from tRBS to merged RBS |
| a5.3.7.5.3 | $IF file is in RBS AND file is in tRBS THEN move all entries for this file from the RBS to merged RBS and add entry from the tRBS to the merged RBS |
| | $ Close the RBS file on the network backup device |
| | $ Replace the tRBS with the merged RBS |
| a5.3.8 | $Overwrite the current RBS on the network backup device with the tRBS; the tRBS becomes the new RBS; if the network backup device is a serial device, add the tRBS to the currently inserted serial medium. |
| a5.3.9 | $REQUEST MasterDaemon to DELETE the current tRBS from the currently active remote node |
| a5.3.9.1 | +MESSAGE; to remote node, delete tRBS |
| a5.3.9.2 | −RESPONSE; done flag |
| a5.3.10 | $REQUEST MasterDaemon to OPEN a new RBS file on the currently active remote node |
| a5.3.10.1 | +MESSAGE: to remote node, open new |

|   |   |
|---|---|
| a5.3.10.2 | RBS file<br>-RESPONSE; done flag |
| a5.3.11 | $DO REQUEST MasterDaemon to write a new RBS block to the currently active remote node |
| a5.3.11.1 | +ALLOCATE a local block of storage |
| a5.3.11.2 | +MESSAGE: to remote node, receive next block of new RBS over the network |
| a5.3.11.3 | -RESPONSE: OK |
| a5.3.11.4 | +MESSAGE: next block of new RBS (from tRBS) |
| a5.3.11.5 | -RESPONSE: OK or write error |
| a5.3.12 | $UNTIL new RBS completely written |
| a5.3.13 | $REQUEST MasterDaemon to DELETE the old RBS from the currently active remote node |
| a5.3.13.1 | +MESSAGE: to remote node, delete RBS |
| a5.3.13.2 | -RESPONSE: done flag |

SUMMARY of DoNetBack.

|   |   |
|---|---|
| a5.1 | $REQUEST MasterDaemon to awaken the network; send each currently active node in the scheduled backup an RBS list |
| a5.2 | $SET done flag to false |
| a5.x* | #Remote nodes generate tRBSs |
| a5.3 | $WHILE not done |
| a5.3.1 | $REQUEST MasterDaemon to get the next available tRBS on the network |
| a5.3.2 | $IF MasterDaemon returns no more nodes THEN set done to true (exit WHILE loop) |
| a5.3.3 | $ALLOCATE space to store tRBS from the remote node |
| a5.3.4 | $DO:REQUEST MasterDaemon to get a tRBS block from the currently active remote node |
| a5.3.5 | $UNTIL tRBS completely read |
| a5.3.6 | $FOR each file in tRBS, copy the file from the remote node to the network backup device, marking each file as successfully backed up or not |
| a5.3.7 | $IF this is an incremental backup, and it is not the FIRST in a series of incrementals THEN, then merge the old RBS (a copy of which was used to generate the current tRBS) with the current tRBS, creating a merged RBS; replace the current tRBS with this merged RBS |
| a5.3.8 | $Overwrite the current RBS on the network backup device with the tRBS; the tRBS becomes the new RBS; if the network backup device is a serial device, add the tRBS to the currently inserted serial medium. |
| a5.3.9 | $REQUEST MasterDaemon to DELETE the current tRBS from the currently active remote node |
| a5.3.10 | $REQUEST MasterDaemon to OPEN a new RBS file on the currently active remote node |
| a5.3.11 | $DO:REQUEST MasterDaemon to write a new RBS block to the currently active remote node |
| a5.3.12 | $UNTIL new RBS completely written |
| a5.3.13 | $REQUEST MasterDaemon to DELETE the old RBS from the currently active remote node |

The present disclosure includes that contained in the appended claims, as well as that of the foregoing description. Although this program has been described in its preferred form with a certain degree of particularity, it is understood that the present disclosure of the preferred form has been made only by way of example and that numerous changes in the details of programming may be resorted to without departing from the spirit of the invention.

Now that the invention has been described,
What is claimed is:

1. A computer network comprising in combination:
a plurality of nodes including a controlling node and one or more remote nodes, said controlling node having computer means and a central backup device, at least one of said remote nodes having computer means and a local storage device;
means located on each of said remote nodes for creating a remote backup set containing a list of files located on respective said local storage devices to be transferred to said central backup device; and
means located on said controlling node for transferring said files listed on said remote nodes over the network to said central backup device.

2. The computer network as set forth in claim 1, wherein at least one of said remote nodes includes a plurality of said local storage devices and wherein said means for creating respective said remote backup sets comprises means for selecting one or more of said remote node's local storage devices whose files are then to be used to create said list of files to be transferred to said central backup device.

3. The computer network as set forth in claim 1, wherein said means for creating respective said remote backup sets comprises means for allowing a selection of files to be included in said list of files to be transferred based upon predetermined selection criteria.

4. The computer network as set forth in claim 1, wherein said means for creating respective said remote backup sets comprises means for including files in said list of files which have changed since a previous backup thereby allowing incremental backups.

5. The computer network as set forth in claim 1, further including means located on said controlling mode for initiating said means for creating respective said remote backup sets, thereby allowing contemporaneous creation of respective said remote backup sets.

6. A method for transferring files from nodes of a computer network to a central backup device, the computer network having a plurality of nodes including a controlling node and one or more remote nodes, at least one remote node having computer means and one or more local storage devices, the method comprising the steps of:
creating a remote backup set on each remote node containing a list of files located on each remote node's storage devices to be transferred to the central backup device; and
transferring the files listed on the remote backup set of each remote node over the network to the central backup device.

7. The method as set forth in claim 6, wherein at least one of the remote nodes includes a plurality of the local storage devices and wherein the step of creating a remote backup set comprises the step of selecting one or more of the remote node's local storage devices whose files are then to be used to create the list of files to be transferred to the central backup device.

8. The method as set forth in claim 6, wherein the step of creating a remote backup set comprises the step allowing a selection of files to be included in the list of files to be transferred based upon predetermined selection criteria.

9. The method as set forth in claim 6, wherein said the step of creating a remote backup set comprises the step of including files in the list of files which have changed since a previous backup thereby allowing incremental backups.

10. The method as set forth in claim 6, further including the step of contemporaneously initiating said means for creating a remote backup set, thereby allowing contemporaneous creation of remote backup sets.

* * * * *